Sept. 12, 1950 R. P. BECHLE 2,521,771
SELECTIVE GEARING

Filed Aug. 8, 1947 2 Sheets-Sheet 1

INVENTOR.
RUDOLPH P. BECHLE
BY
James G. Bethell
ATTORNEY

Sept. 12, 1950  R. P. BECHLE  2,521,771
SELECTIVE GEARING

Filed Aug. 8, 1947  2 Sheets-Sheet 2

INVENTOR.
RUDOLPH P. BECHLE
BY
James G. Bethell
ATTORNEY

Patented Sept. 12, 1950

2,521,771

UNITED STATES PATENT OFFICE 2,521,771

SELECTIVE GEARING

Rudolph P. Bechle, Yonkers, N. Y., assignor to Potdevin Machine Company, Brooklyn, N. Y., a corporation of New York Application August 8, 1947, Serial No. 767,378

2 Claims. (Cl. 74—681)

My invention relates broadly to selective gear boxes whereby a large number of positive gear ratios can be provided, these ratios to be in equal increments.

More specifically my invention relates to mechanism for multi-size printing presses for gearing the printing cylinders to the feed rollers to provide for a multiplicity of print lengths.

As illustrated in the accompanying drawings and hereinafter described I provide for print lengths from 0 to 99.99 inches in increments of .01 inch. It is to be understood, however, that this showing is merely for clarity of description and that the same may be altered without invention to cover different ranges and to operate in either smaller or larger increments.

My improved mechanism may be used direct as a power transmission appliance if designed to carry considerable amounts of power. It may also be used as a "pilot" or control mechanism to operate a variable speed device in conjunction with the mechanism constituting the subject-matter of my copending application Serial No. 721,201, filed January 10, 1947. In this latter connection my apparatus may be made very light since the power it must transmit is virtually negligible.

In the accompanying drawings which illustrate an embodiment of my invention,

Figure 1:
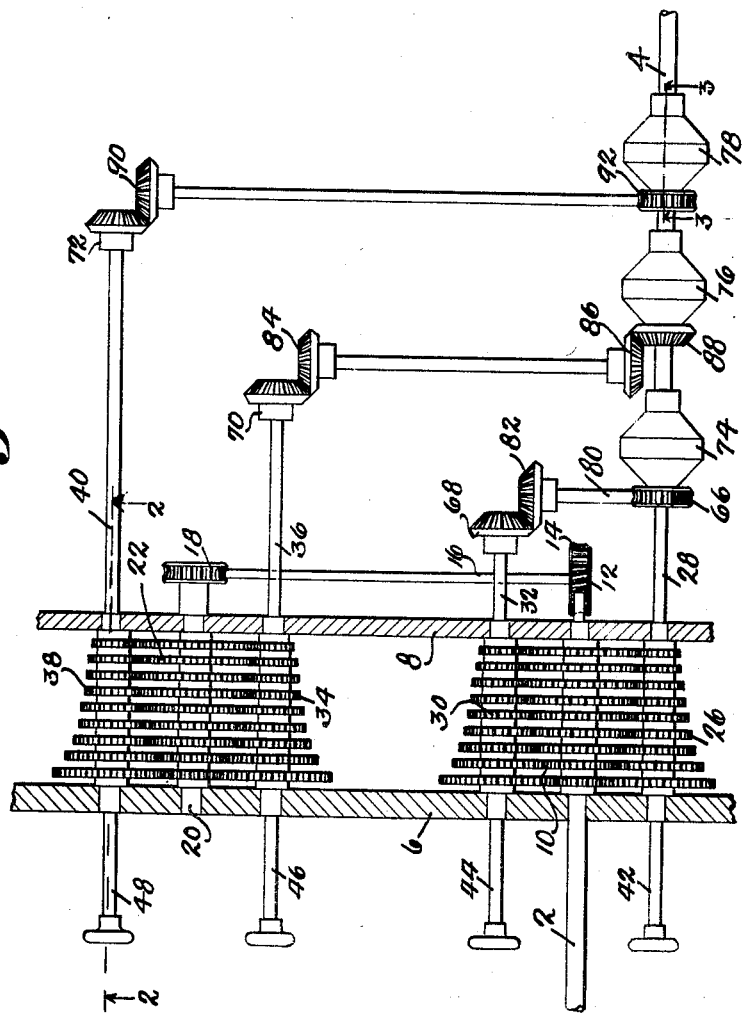
Fig. 1 is an elevational view.

Referring to the drawings in detail 2 designates an input shaft and 4 the output shaft. As illustrated the shaft 2 is to revolve at one revolution per impression, while the shaft 4 is arranged to feed 30" of paper per revolution. These speeds are merely illustrative, however, inasmuch as obviously the shaft 2 could be set up to revolve at any fixed ratio with impression speed; likewise the amount of paper fed per revolution of the output shaft 4 could be varied without invention.

It is to be understood also that the expressions "input" and "output" as applied to the shafts 2 and 4, respectively can be reversed.

The input shaft is mounted in suitable bearings in the machine frame 6 and support 8, and carries a cluster of nine gears 10, all fixed to the shaft.

In addition to the gears 10, the input shaft 2 carriers a worm 12 driving worm wheel 14 fast on a shaft 16, which through a worm and worm wheel drive 18 drives a shaft 20 carrying a gear cluster 22, which is identical with the gear cluster 10. The gears of cluster 22 are fast on the shaft 20 which is mounted in suitable bearings in the frame 6 and support 8.

26 designates a gear cluster of nine gears meshing with the gears of cluster 10. The gears of cluster 26 are loosely mounted on shaft 28.

At the side of gear cluster 10 opposite the cluster 26 is another gear cluster 30 of nine gears loosely mounted on shaft 32. The gears of the cluster 30 are in mesh with the gears of cluster 10 and are identical with gear cluster 26.

At one side of the gear cluster 22 I provide a gear cluster 34 of nine gears meshing with the gears of cluster 22 and identical with gear clusters 26 and 30. The gears of cluster 34 are loosely mounted on shaft 36.

At the side of the cluster 22 opposite gear cluster 34 is another cluster 38 of nine gears meshing with the gears of cluster 22 and identical with clusters 26, 30 and 34. The gears of cluster 38 are loose upon shaft 40.

Figure 2:
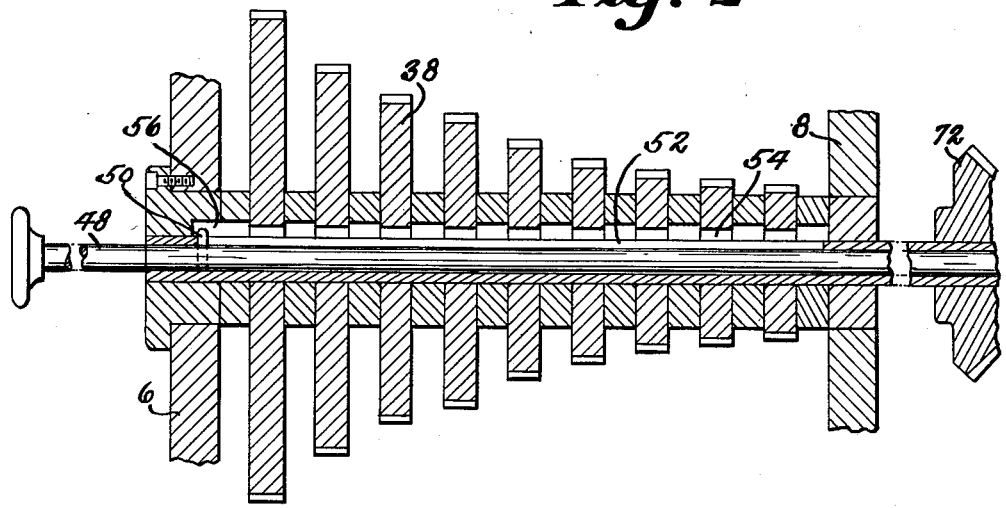
Fig. 2 is a section on the line 2—2 of Fig. 1.
Figure 3:
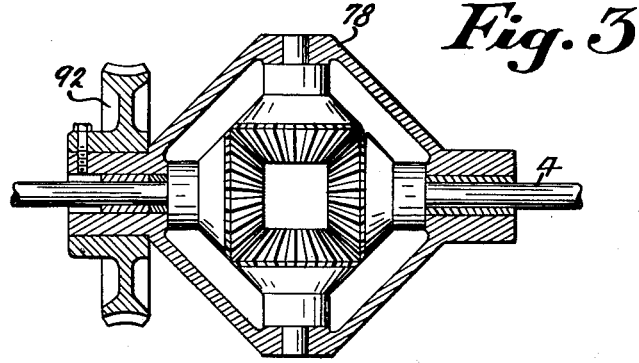
Fig. 3 is a section on the line 3—3 of Fig. 1.

The shafts 28, 32, 36 and 40 for the gear clusters 26, 30, 34 and 38 are tubular as will be seen from Fig. 2 which illustrates the construction of these four clusters. Extending through each of these tubular shafts is a clutch rod. These rods are designated 42, 44, 46 and 48, respectively. Each of these rods is provided with a clutch pin 50 projecting radially therefrom. Each rod is movable longitudinally and each of the tubular shafts 28, 32, 36 and 40 is provided through its wall with a longitudinally extending slot 52 through which the pin 50 projects. Each gear of each of the clusters 26, 30, 34 and 38 is slotted as shown at 54. From this construction it will be apparent that by moving the clutch rod lengthwise any gear desired of the clusters 26, 30, 34 and 38 can be clutched to the corresponding gear of the adjacent cluster. With the pin 50 out of clutching position all of the gears of each of the gear clusters 26, 30, 34 and 38 will merely be rotated idly on their respective shafts. In addition to the clutch construction described the clutch shafts may be moved to the left as viewed in Figs. 1 and 2 so that the pins 50 will engage a slot 56 provided for that purpose in the machine frame to lock each of the gear shafts 28, 32, 36 and 40 against rotation to the machine frame.

Fixed to the outer ends of the gear cluster shafts 32, 36 and 40 are gears 68, 70 and 72, respectively.

74, 76 and 78 designate three ordinary differentials in alignment with each other and with shaft 28 of gear cluster 26 and with output shaft 4. The shaft 28 constitutes the input shaft of the differential 74. Affixed to the housing of this differential is worm wheel 66, driven by a worm carried at one end of a shaft 80, the opposite end of which carries a bevel gear 82 meshing with the bevel gear 68, above referred to, carried on the outer end of shaft 32 of gear cluster 30.

The housing of differential 76 is geared to gear cluster 34, by bevel gears 70, 84, 86 and 88.

The housing of differential 78 is geared to gear cluster 38, by bevel gears 72, 90 and worm and worm wheel 92 the latter being secured to the differential housing.

The three differentials 74, 76 and 78 are identical in construction and each has 1:1 ratio of input and output shafts and an effect of 2 revolutions of the output shaft to one revolution of the housing.

For purposes of this description let it be assumed that the ratio of the worm and worm gear 66 forming part of the train between the housing of differential 74 and the gear cluster 30 is 20:1.

Let it be assumed also that the ratio of the worm and worm wheel 14 is 10:1 while that of worm and work wheel 18 is 20:1, so that gear cluster 22 operates at $\frac{1}{200}$ the speed of gear cluster 10.

The gears 70, 84, 86 and 88 by which gear clusters 22 and 34 are geared to the housing of differential 76 provide a 1:1 ratio between these gear clusters and the differential housing, while let it be assumed that the worm and worm wheel 92 between gear clusters 22 and 38 and the housing of differential 78 is 10:1 ratio.

The gears used in the several gear clusters may be as follows:

| Clusters 10 and 22 | Clusters 26, 30, 34, and 38 | Ratio | Center Distance |
|---|---|---|---|
| 50T—20P | 150T—20P | 1:3 | 5″ |
| 80T—20P | 120T—20P | 2:3 | 5″ |
| 100T—20P | 100T—20P | 3:3 | 5″ |
| 80T—14P | 60T—14P | 4:3 | 5″ |
| 100T—16P | 60T—16P | 5:3 | 5″ |
| 120T—18P | 60T—18P | 6:3 | 5″ |
| 140T—20P | 60T—20P | 7:3 | 5″ |
| 160T—22P | 60T—22P | 8:3 | 5″ |
| 150T—20P | 50T—20P | 9:3 | 5″ |

It will be apparent from the foregoing that by using gear clusters 10 and 26, and locking the other clusters so that they are inoperative, one can feed 0, 10, 20, 30, 40, 50, 60, 70, 80 or 90″ of paper per revolution of the shaft 2, depending upon the setting of the clutch shaft 42.

By adding the effect of clusters 10 and 30, the output of which it has been assumed is geared to the housing of differential 74 through a 20:1 ratio, it will be seen that an increment of $\frac{1}{10}$ the size of the corresponding gears of clusters 10 and 26 will be added to the lengths supplied by clusters 10 and 26. Thus by proper setting of clutch rod 44 one can add 0, 1, 2, 3, 4, 5, 6, 7, 8, or 9″ to any of the lengths produced by clusters 10 and 26.

It has been assumed that gear cluster 22 is operated at $\frac{1}{200}$ the speed of gear cluster 10 through worm and worm wheel combinations 12 and 18. It has also been assumed that clusters 22 and 34 are geared 1:1 to the housing of differential 76. Therefore by proper setting of clutch shaft 46 of gear cluster 34, $\frac{1}{100}$ of the increment of clusters 10 and 26 may be added, or 0, .1, .2, .3, .4, .5, .6, .7, .8, or .9″.

It has been assumed that clusters 22 and 38 are geared 10:1 to differential of housing 78, giving an additive effect of $\frac{1}{1000}$ of clusters 10 and 26. Thus one can add 0, .01, .02, .03, .04, .05, .06, .07, .08, .09″ to the increment of clusters 10 and 26.

My improved mechanism therefore provides for print, lengths of from 0″ to 99.99″ in increments of .01 or a total of 10,000 combinations.

It will be understood of course, that if finer increments are desired, additional banks of gear clusters and differentials can be added. By the same token if coarser increments are satisfactory one or more banks of gear clusters may be omitted. These changes are within the comprehension of my invention and may be made or resorted to without departure from the spirit and scope thereof.

What I claim is:

1. In combination, a shaft, a gear cluster fast thereon, a second gear cluster in constant mesh with the first gear cluster, a shaft upon which the gears of the second cluster are freely rotatable; a bevel type planetary unit, the shaft for the second gear cluster constituting the input shaft of the unit; an output shaft for the unit, gears on the adjacent ends of the input and output shafts of the unit, and intermediate gears for gearing the first-mentioned gears of the unit to each other; a rotatable unit housing surrounding the gears of the unit, said intermediate gears being mounted on the housing; a third gear cluster in constant mesh with the first-mentioned gear cluster; a shaft upon which the gears of the third gear cluster are freely rotatable; a gear drive from the third gear cluster shaft to the rotatable housing of the planetary unit; locking means for selectively locking any gear of the second gear cluster to its shaft, thereby to vary the speed of the output shaft of the planetary unit; and locking means for selectively locking any gear of the third gear cluster to its shaft, thereby to obtain a further variation in the speed of the output shaft of the planetary unit.

2. In combination, a shaft, a gear cluster fast thereon, a second gear cluster in constant mesh with the first gear cluster, a shaft upon which the gears of the second cluster are freely rotatable; a bevel type planetary unit, the shaft for the second gear cluster constituting the input shaft of the unit, an output shaft for the unit; gears on the adjacent ends of the input and output shafts of the unit and intermediate gears for gearing the first-mentioned gears of the unit to each other; a rotatable unit housing surrounding the gears of the unit, said intermediate gears being mounted on the housing; a third gear cluster in constant mesh with the first-mentioned gear cluster; a shaft upon which the gears of the third gear cluster are freely rotatable, a gear drive from the third gear cluster shaft to said rotatable housing of the planetary unit; a fourth gear cluster and a shaft therefor, to which the gears are fixed; a gear drive from this shaft to the shaft of the first gear cluster; a fifth gear cluster meshing constantly with the fourth gear cluster; a shaft for the fifth gear cluster upon which the gears are rotatably mounted; a second planetary unit in axial alignment with the first unit; the output shaft of the first planetary unit constituting the input shaft of the second unit; said second planetary unit comprising an output shaft, gearing for gearing the input and output shafts to each other, and a rotatable housing carrying this gearing; a drive for the housing of the second planetary unit from the shaft of the fifth gear cluster; locking means for selectively locking any gear of the second gear cluster to its shaft, thereby to obtain a variation in the speed of the output shaft of the second planetary unit; locking means for selectively locking any gear of the third gear cluster to its shaft, to obtain a further variation in the speed of the output shaft of the second planetary unit; and locking means for selectively locking any gear of the fifth gear cluster to its shaft, thereby to obtain a still further variation in the speed of the output shaft of the second planetary unit.

RUDOLPH P. BECHLE.

REFERENCES CITED

The following references are of record in the file of this patent:

UNITED STATES PATENTS

| Number | Name | Date |
| --- | --- | --- |
| 1,967,559 | Schreck | July 24, 1934 |
| 2,111,996 | Slye | Mar. 22, 1938 |
| 2,230,147 | Slye | Jan. 28, 1941 |
| 2,375,787 | Hazard et al. | May 15, 1945 |

FOREIGN PATENTS

| Number | Country | Date |
| --- | --- | --- |
| 460,369 | Great Britain | Jan. 25, 1937 |